United States Patent

[11] 3,570,793

| [72] | Inventor | Joseph T. Shackel<br>14636 Bringard, Detroit, Mich. 48205 |
|---|---|---|
| [21] | Appl. No. | 752,230 |
| [22] | Filed | Aug. 13, 1968 |
| [45] | Patented | Mar. 16, 1971 |

[54] FISHING ROD HOLDER
9 Claims, 9 Drawing Figs.

[52] U.S. Cl. ..................................................... 248/42
[51] Int. Cl. ........................................................ A01k 97/10
[50] Field of Search........................................... 248/38,
407, 314, 40, 41, 42; 248/82, 84, 86, 87, 88;
43/21.2; 292/302

[56] References Cited
UNITED STATES PATENTS

| 486,822 | 11/1892 | Chandler.................. | 248/407 |
|---|---|---|---|
| 1,467,621 | 9/1923 | Mahoney..................... | 248/40 |
| 1,676,032 | 7/1928 | Howard....................... | 248/41 |
| 1,373,087 | 3/1921 | Leyerer....................... | 248/88 |
| 2,961,209 | 11/1960 | Willey......................... | 248/41 |
| 2,973,930 | 3/1961 | Smith.......................... | 248/40 |
| 3,014,679 | 12/1961 | Jepson......................... | 248/42X |
| 3,089,674 | 5/1963 | Bastie.......................... | 248/40 |
| 3,444,643 | 5/1969 | Dobbs.......................... | 43/21.2X |

*Primary Examiner*—Edward C. Allen
*Attorney*—Hauke, Gifford and Patalidis

ABSTRACT: A pair of holders are disclosed for supporting a fishing rod in a selected orientation on a boat or other supporting surface. In each embodiment, the handle of the rod is seated in a support mounted at the upper end of an upright post, and a spring-biased keeper, mounted on the support, is movable between a first position in which it prevents removal of the fishing rod handle from its seat, and a second position in which it allows the handle to be inserted into or removed from its seat. In one embodiment the lower end of the post can be mounted in the oarlock of a boat, in the other embodiment the post can be mounted in a boat gunnel.

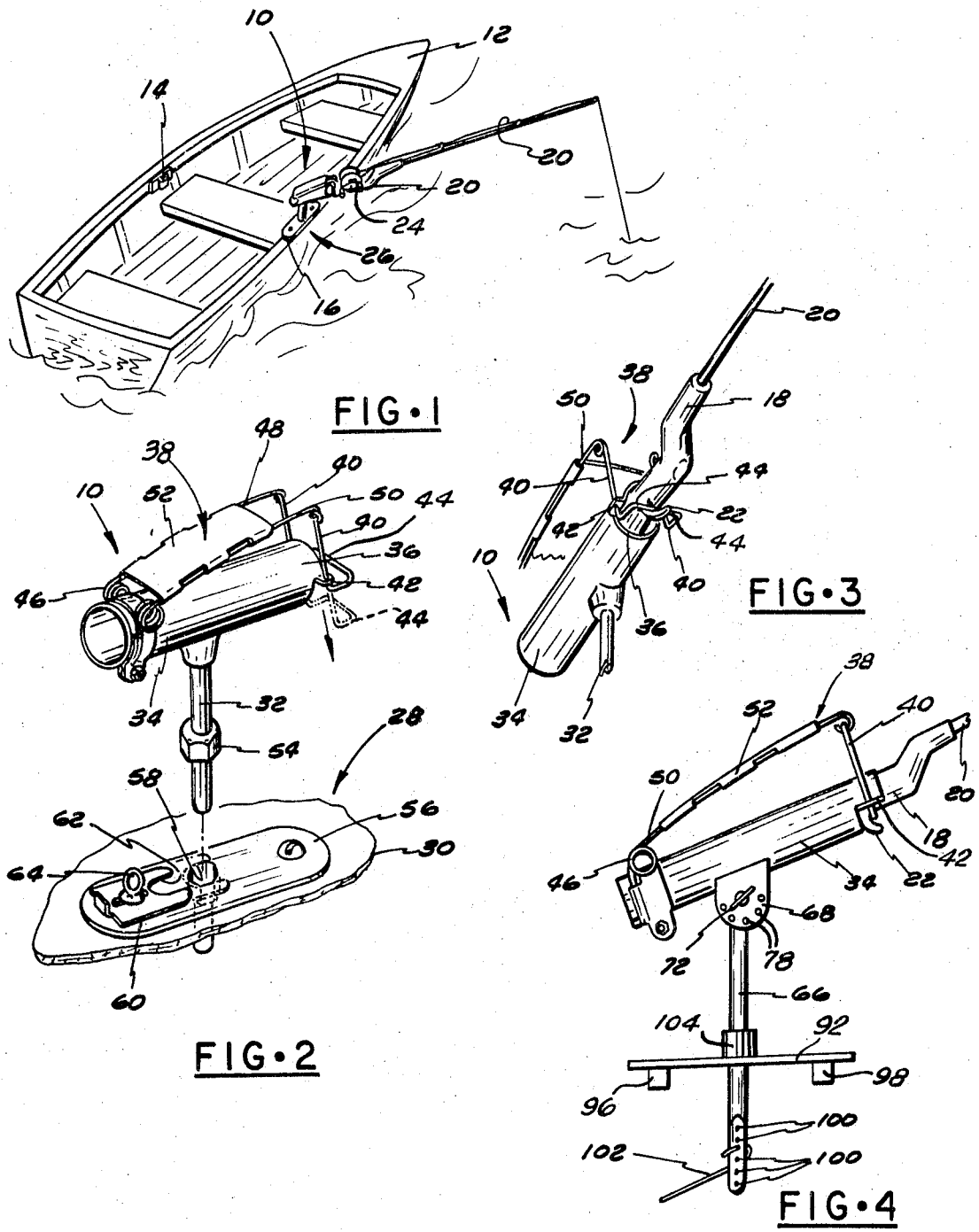

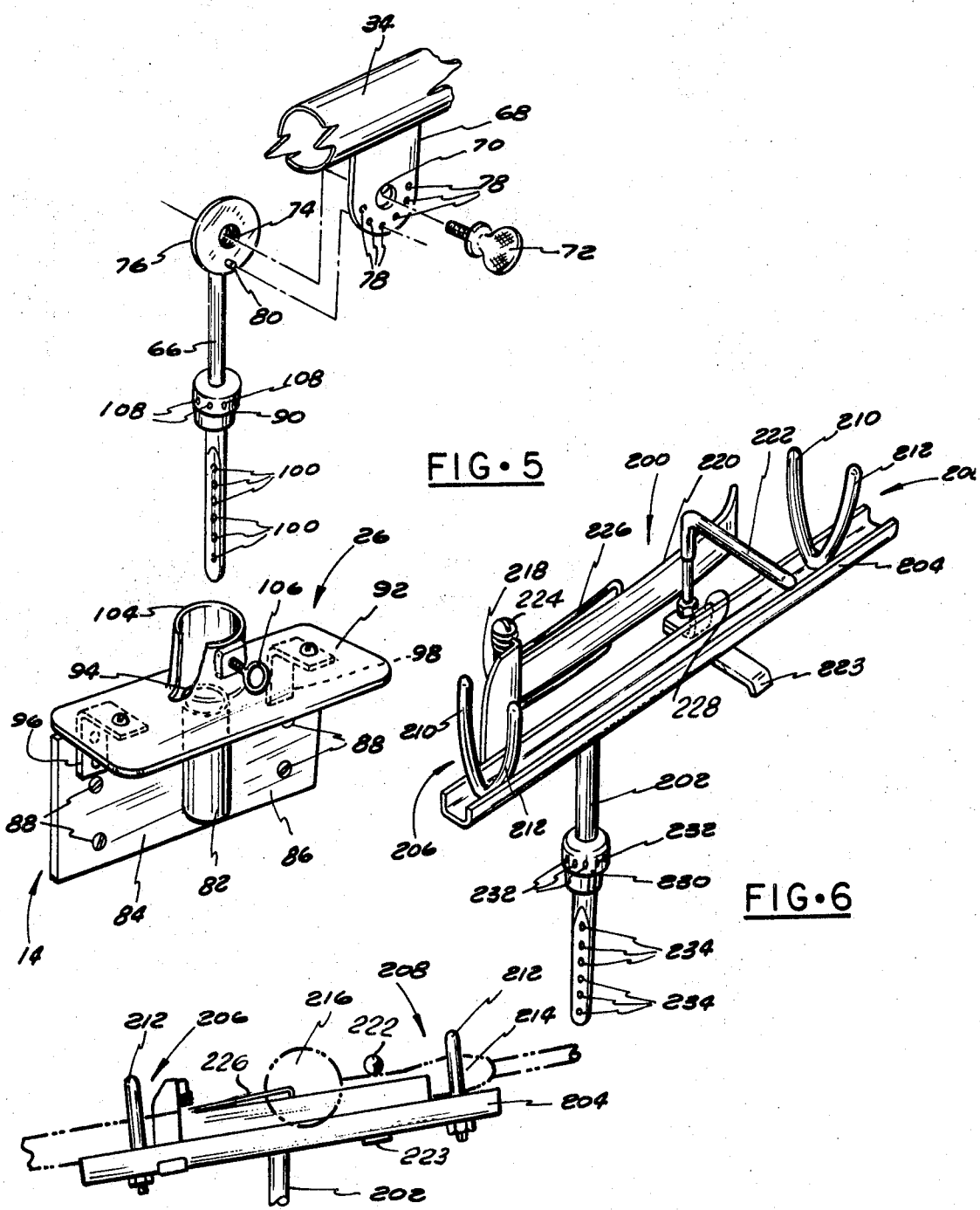

INVENTOR
JOSEPH T. SHACKEL

FISHING ROD HOLDER

BACKGROUND OF THE INVENTION

This invention relates to fishing rod holders and more specifically to a holder having a spring-biased keeper mounted on a support that allows the user to easily insert the handle of the fishing rod on the support means and then to securely lock the handle to the support.

Fishing rod holders are commonly employed by fishermen to mount the fishing rod such that it does not require manual support so that the fisherman can engage in other activities while waiting for a bite. Normally such holders are portable so that they can be carried with the other fishing accessories of the fisherman.

One problem associated with conventional holders is that they either do not securely lock the handle of the rod to the holder, or they have a lock that requires a considerable amount of manipulation in order to mount the handle of the rod in its supported position, or to separate it from the holder.

SUMMARY OF THE INVENTION

The broad purpose of the present invention is to provide an improved fishing rod holder having a spring-biased keeper that enables the handle of the rod to be quickly and easily locked in the holder or removed from the holder. The preferred embodiments of the invention have means for mounting the holder on a boat with the rod pointed in a selected orientation with respect to the boat. In one embodiment the holder is adapted to be mounted in the oarlock of a boat. In the other embodiment, the holder has a socket that is fastened to a boat gunnel. In addition, means are provided which allow the holder to be tilted with respect to its support and locked in a selected tilted position.

The preferred embodiment of the invention comprises a tube that is mounted on the upper end of a portable support post and provided with an open end for receiving the butt end of a fishing rod. One handle form of conventional handle has a fingerpiece that is positioned adjacent the open end of the tube. A spring-biased, generally U-shaped keeper is mounted adjacent the open end of the tube with its legs connected to opposite sides of the tube in such a manner that its midsection is movable toward and away from the end of the tube between a release position which allows the handle to be either inserted in or removed from the tube, and a locking position in which the midsection of the keeper and the end of the tube form a socket for the fingerpiece which prevents removal of the handle from the tube. The two legs of the keeper are connected by a pressure plate to a spring that is mounted adjacent the other end of the tube. The pressure plate allows the fisherman to move the keeper toward its release position with one hand while he either inserts or removes the handle of the fishing rod with his other hand. When the pressure plate is released, the spring moves the keeper toward its latch position.

The second embodiment of the invention has special advantages for supporting fishing rods that do not employ a fingerpiece and which usually are of such a size that they require both hands of the fisherman to manipulate the rod. In this form of the invention, the holder is also mounted on the upper end of a support post and comprises an elongated base member having a pair of spaced, U-shaped supports that are aligned with one another to form a cradle for receiving the handle of the fishing rod to a position between the legs of the two supports. A spring-biased arm that is pivotally mounted on the base member carries a U-shaped keeper member having a pair of short arms. The arm is biased toward a latch position in which the short arms straddle the base member and the fishing rod handle to prevent the handle from being removed from its position in the cradle, and a release position in which the handle can be easily mounted in or removed from its cradle. The keeper arm is biased toward its latch position but allows the fisherman to move it with one hand to its release position while manipulating the fishing rod with his other hand.

The preferred embodiments of the invention provide a relatively inexpensive lightweight means for supporting the handle of the fishing rod in a raised position, allows the fishing rod to be easily but securely locked in a selected, tilted position and pointed in a selected direction, and also permits the easy and quick separation of the rod from its holder.

Other advantages of the present invention will become readily apparent to one skilled in the art to which the invention pertains upon reference to the following detailed description.

DETAILED DESCRIPTION OF THE DRAWINGS

The description refers to the accompanying drawings in which like reference characters refer to like parts throughout the several views and in which:

FIG. 1 is a perspective view showing a fishing rod holder illustrating the preferred embodiment of the invention mounted on the oarlock of a boat;

FIG. 2 is an enlarged perspective view of the holder of FIG. 1 showing the support post separated from a socket in the gunnel of a boat which provides an alternate support means;

FIG. 3 is a view showing the lower side of the holder of FIG. 1 and the manner in which the keeper and the tubular holder cooperate to form a socket for the fingerpiece of the fishing rod handle;

FIG. 4 is a side view of a modified form of the holder of FIG. 1 showing an adjustable tilt feature;

FIG. 5 is an exploded view of the fishing rod holder of FIG. 1;

FIG. 6 is a perspective view of another embodiment of the invention;

FIG. 7 is a side view of the embodiment of FIG. 6 showing the manner in which the handle of the fishing rod is mounted in the holder;

DESCRIPTION OF THE PREFERRED EMBODIMENT

Figure 8:
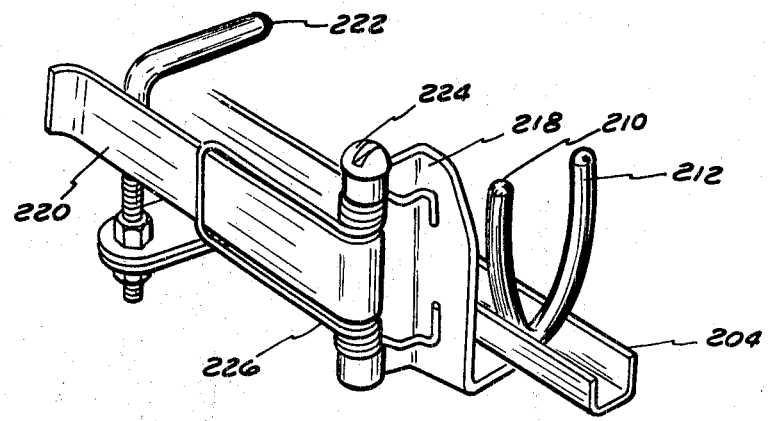
FIG. 8 is a perspective view showing the opposite side of the holder of FIG. 6 with the keeper in its latching position.

Referring to the drawings, FIG. 1 shows a fishing rod holder, generally indicated at 10, which illustrates the preferred embodiment of the invention mounted on the side of a boat 12 having pair of oarlocks 14 and 16. The holder 10 is illustrated as supporting the handle 18 of a conventional fishing rod 20. The handle has a lateral fingerpiece 22 that is below the position in which a reel 24 is normally mounted on the handle. The holder 10 is mounted on a base means 26, best shown in FIG. 5, which is seated on top of the oarlock 14 of the boat. It can also be mounted in a base means 28 which is attached on a gunnel 30 of a boat as can best be seen in FIG. 2.

Referring to FIG. 2 and 3, the holder 10 comprises a support post 32 having an elongated tubular member 34 fixedly mounted at its upper end with the axis of the tubular member 34 generally transverse to the longitudinal axis of the post. Both ends of the tubular element 34 are open with one end 36 providing an opening for receiving the butt end of the handle 18 of the rod to a position in which the fingerpiece 22 is adjacent the end 36. Thus it can be seen that the tubular member 34 provides a socket for the handle 18.

A generally U-shaped keeper 38 has a pair of spaced legs 40 that are slidably mounted in a pair of lugs 42, which extend from opposite sides of the tubular member adjacent the open end 36, so that its midsection 44, which is bent at right angles to the legs, is movable between a lower, release position in which it is spaced from the open end 36 a sufficient distance to allow the handle to be inserted or removed through the opening and a latching position in which the midsection 44 and the end 36 cooperate to form a socket for the fingerpiece 22. In its latching position, the keeper prevents the handle from being moved out of the tubular member 34.

A spring member 46, mounted at the opposite end of the tubular member 34, has a pair of legs 48 and 50 connected to the upper ends of the legs 40 of the keeper. The legs 48 and 50 are formed such that when moved toward the tubular member, they move the keeper toward its lower, release position, and when released by the fisherman, they return the keeper toward its raised latching position. A pressure plate 52, supported by the two legs 48 and 50, provides means for the fisherman to apply a release effort on the latch member in a direction toward the tubular member 34.

In the embodiment of FIG. 2, the support post has a hexagonal member 54 at its midsection. The base means 28 comprises a mounting plate 56 having a hexagonal opening 58 which provides a socket for receiving the lower end of the post to a position in which the member 54 engages the opening 58 in an upright position to lock the post against rotation from a selected orientation with respect to the boat.

By lifting the post 32 so that the member 54 clears the opening 58, the support post can be rotated to a different orientation, and then inserted into the opening. This allows the fisherman to support the rod in the holder so that it is pointed in a variety of directions with respect to the boat. A latch plate 60 movably mounted on the mounting plate 56 has a recess 62 which is movable toward the post and above the member 54 to separation separation of the post from its socket. A fastener 64 provides means for clamping the latch plate 60 against movement with respect to the mounting plate 56.

FIGS. 4 and 5 show a variation of the embodiment of FIGS. 2 and 3 in which the tubular member 34 is pivotally mounted at the upper end of a support post 66. In this embodiment, a plate member 68 which is fixedly attached to the lower side of the tubular member 34 has an opening 70 for receiving a fastener 72. The fastener 72 is adapted to be threadably engaged in an opening 74 in a support section 76 at the upper end of the support post 66. The openings 70 and 74 are formed such that the tubular member 34 can be pivoted about an axis that is transverse to the longitudinal axis of the post 66.

The plate 68 has a series of sockets 78 that are formed in an annular array about the pivotal axis of the plate 68. Each of the sockets is engageable by a pin 80 that is carried on the member 76 in association with a different tilted position of the fishing rod. The fisherman, by tilting the tubular member 34 to a selected position with respect to the post, then moves the plate 68 toward the member 76 until the pin 80 is received by one of the sockets 78 which is associated with a selected tilted position. He then clamps the plate 68 between the member 76 and the fastener 72 so that the tubular member 34 is fixedly mounted on the upper end of the post 66.

The embodiment of the invention illustrated in FIG. 4 is adapted to be mounted on a boat oarlock of the type illustrated by the oarlock 14 or 16 in FIG. 1. Such oarlocks normally have a tubular section 82 (FIG. 5) which is adapted to receive a pin carried by an oar (not shown), and a pair of side flanges 84 and 86 that are mounted on the side of the boat by a plurality of threaded fasteners 88.

In this embodiment, the post 66 is received in the tubular section 82 of the oarlock and has a locking section 90 that is seated on a base plate 92. Base plate 92 mounts on the upper end of the tubular section 82 and has an opening 94 aligned with the upper end of the opening of the tubular member 82. The post 66 is inserted through the opening 94 and the tubular member 82.

A pair of positioning lugs 96 and 98, carried on the lower side of the base plate 92 are so positioned that when the post 66 is inserted in the oarlock, they abut the side flanges 84 and 86 and prevent the base plate from being rotated with respect to the oarlock.

The post 66 has a sufficient length so that its lower end extends below the tubular section 82. Its lower end has a series of openings 100 for receiving a retainer member 102 that prevents the post from being unintentionally moved from the oarlock.

A tubular member 104 on the upper side of the base plate receives the locking section 90 when the post 66 is in the oarlock, and carries a threadably mounted fastener 106 which is engageable with a series of sockets 108 formed in the member 90 about the longitudinal axis of the post 66. The sockets 108 and the fastener 106 are arranged such that the fisherman can rotate the post 66 to a selected orientation with respect to the base plate and then, by rotating the fastener 106 so that its lower end engages one of the sockets 108, lock the post 66 against rotation. To reorient the post 66, the locking member 106 is rotated so that it is separated from the sockets, the post rotated about its longitudinal axis to another position and then the fastener 106 engaged with the appropriate socket.

Thus it can be seen that the embodiments of the invention, illustrated in FIGS. 1 to 5, illustrate an improved holder that allows the fisherman to mount the fishing rod such that it is supported at a selected angular orientation with respect to the boat and locked in a selected tilted position. In addition, means have been shown for mounting the holder either in the oarlock of a boat or the gunnel of a boat.

FIGS. 6 to 9 show another embodiment of the invention that is useful for supporting a fishing rod that does not have a fingerpiece. The holder 200 has an upright post 202 adapted for mounting either on a boat oarlock or a boat gunnel with suitable socket means. The holder 200 comprises an elongated channel-shaped member 204 that is fixed to the upper end of the post 202 such that when the post 202 is in an upright position, the base member 204 is slightly inclined with respect to the horizontal. It is to be understood that the member 204 can also be provided with a tilting attachment of the type illustrated in FIG. 5.

A pair of U-shaped supports 206 and 208, each having a pair of upright, preferably rubber-coated legs 210 and 212 are mounted on the base member 204 to form a cradle for the handle of a fishing rod. The legs 210 and 212 are spaced from one another a sufficient distance to allow the handle 214 of the rod to be inserted between the legs with its reel 216 disposed between the two support members.

An upright member 218 is fixedly attached to the rear end of the base member 204 and supports an elongated arm 220 that extends forwardly such that its outer end is movable toward a position closely adjacent the forward support member 208. A rubber coated, short, keeper arm 222, carried adjacent the outer end of the arm 220, is supported such that it is movable to a position in which it is transverse to the longitudinal axis of the base member 204 and also to the legs 210 and 212 of the two support members.

Figure 9:
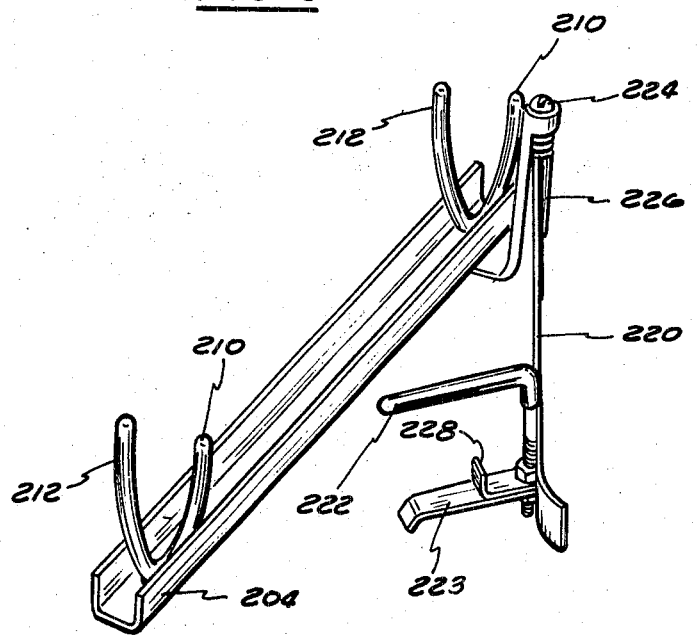
FIG. 9 is another view of the holder of FIG. 6 with the keeper in its release position.

The arm 220 is pivotally connected to the upright member 218 so that the keeper arm 222 can be moved between its latching position, illustrated in FIGS. 6 and 8, in which it is between the supports 206 and 208, and its release position, illustrated in FIG. 9, in which it is laterally spaced from its latching position. The arm 220 is connected to the upright member 218 by a pin 224. A spring 226 biases the arm toward a position in which it is substantially parallel to the base member 204 and the keeper 222 is in its locking position. A second short arm 223 is also carried by the arm 220 below and parallel to the keeper arm 222. A stop member 228, carried on the lower arm 223, is engageable with the side of the base member 204 to define the extreme latching position of the arm 220.

In use, the fisherman moves the arm 220 laterally away from the base member 204 with one hand, inserts the handle 214 of the fishing rod to its cradled position in which it is supported between the legs of the supports 206 and 208, releases the arm 220 so that it is moved by the spring 226 toward the support and the keeper arm 222 is carried toward its latching position. When the keeper arm is in its latching position, it can be seen that the handle 214 of the fishing rod is substantially totally encircled and blocked against motion by the keeper arm 222, the base member 204 and the legs of the support members 206 and 208. The fisherman can quickly remove the handle 214 from the holder by moving the arm 220 out toward its lateral position and then lifting the handle 214 from between the legs of the supports 206 and 208.

A locking member 230 is carried on the midsection of the post 202 and provided with a series of sockets 232 to allow the holder of FIG. 6 to be mounted in a base member of the type illustrated in FIG. 5, and a series of openings 234 at its lower end to provide means for the fisherman to insert a retainer member that prevents the post from being accidentally removed from the oarlock.

I claim:

1. A holder for the handle of a fishing rod, comprising:
   a support means;
   b. a first member mounted on said support means having means for receiving the handle of the fishing rod;
   c. a second member;
   d. means mounting said second member on said first member for motion with respect to the first member between a first position in which said second member cooperates with said first member to lock said handle of said fishing rod against motion with respect to said first member, and a second position in which said second member allows said handle to be mounted in or removed from said first member;
   e. bias means for urging said second member toward its first position; and
   f. said handle having a fingerpiece that extends laterally with respect to the longitudinal axis of said handle; said means on said first member for receiving said handle forming a first socket having an opening for receiving the butt end of said handle to a position in which the fingerpiece is adjacent said opening; and said second member, in its first position cooperating with said first member to form a second socket for said fingerpiece such that said handle is restrained against motion out of said first socket.

2. A holder as defined in claim 1, in which said first socket is formed of a tubular element having an open end that allows passage of the butt end of said handle to a position in which said fingerpiece is adjacent said open end, and said second socket comprises a generally U-shaped keeper having a pair of legs, joined by a midsection straddling said tubular element such that its midsection is movable in a lateral direction with respect to the longitudinal axis of said tubular element between its first position in which its midsection is proximate the open end of said tubular element and its second position in which its midsection is laterally spaced with respect to said tubular element a sufficient distance to allow said fingerpiece to be positioned between the open end of said tubular element and the midsection of said keeper at such times as said keeper is in its first position; said mounting means for said keeper comprises a pressure plate means connected to the legs of said keeper and supported by said bias means for motion toward a first position in which said pressure plate means is moved by said bias means to move said keeper to its first position; and toward a second position in which said pressure plate means is operable to move said keeper toward its second position in opposition to the force of said bias means.

3. A holder as defined in claim 1, including means mounting said first member on said support means for pivotal motion with respect to said support means between spaced angular positions and means for locking said first member in a selected angular position with respect to said support means.

4. A holder as defined in claim 3, in which said support means comprises a post adapted to be mounted in an upright position, and said first member is mounted at the upper end of said post for pivotal motion about a pivotal axis that is transverse to the longitudinal axis of said post; said locking means comprises a plate fixed to said first member having a series of sockets formed in an annular array about said pivotal axis, and a pin, fixed with respect to said post, selectively engageable with one of said sockets; and fastener means for clamping said plate to said post when said pin is engaged in a selected socket so that the handle of the said fishing rod is supported in a selected, tilted position with respect to said post.

5. A holder as defined in claim 1, in which said support means includes:
   a. an elongated post having upper and lower ends;
   b. means attaching said first member at said upper end of the said post;
   c. socket means for receiving the lower end of said post in a first position, and in a second position in which the post is rotated about its longitudinal axis with respect to its first position; and
   d. locking means on said socket means for locking said post in one of its positions against rotatable motion relative to said socket means.

6. A holder as defined in claim 5, in which said socket means comprises:
   a. an oarlock having an opening; and
   b. a base member seated on said oarlock with an opening aligned with the opening in said oarlock in such a manner that said base member is restrained against motion with respect to said oarlock when the lower end of said post is disposed in both of said openings.

7. A holder as defined in claim 5, in which said socket means comprises a base member having a planar surface adapted for fixed attachment to the gunnel of a boat, and having an opening for receiving the lower end of said post; said locking means comprising means on said post engageable with complementary means in the opening of said base member to lock said post against rotation at a selected one of its positions; and means on said base member operable to prevent removal of said post from said opening at such times as it is in one of its selectable positions whereby the handle of said fishing rod can be supported in a selected radial orientation with respect to said base member.

8. In combination with a base support having a socket; a fishing rod holder comprising a longitudinal rod-receiving member, a post mounted to the underside of said rod-receiving member for extension downwardly therefrom in a direction substantially normal to the longitudinal axis of said rod-receiving member, spring biased retaining means mounted on said rod-receiving member to selectively retain or release said fishing rod, said retaining means comprising a pair of spring arms extending normally in a direction longitudinally to said rod-receiving member and having one of their ends secured thereto, the other ends of said spring arms being provided with said retaining means adapted to be biased into locking engagement with said fishing rod when said fishing rod is in said rod-receiving member for retainment therein, said post and said socket means having means to selectively rotatably mount said post in said socket of said base support, said last-mentioned means comprising a radially extending lock member carried by said post, said lock member having a multisided peripheral surface, said socket having a multisided surface adapted to be engaged by all of the sides of said lock member to prevent relative rotational movement between said lock member and said socket; and securing means adapted to restrain said post against longitudinal removal from said socket of said base support.

9. The combination as defined in claim 8 wherein said clamping means associated with said base support comprises a latch plate movably mounted on said base support and having a recess for engagement with an upper surface of said lock member when said lock member is inserted within said socket to prevent longitudinal removal of said post from said socket, and fastening means to tighten said latch plate onto said base support.

UNITED STATES PATENT OFFICE
CERTIFICATE OF CORRECTION

Patent No. 3,570,793                    Dated March 16, 1971

Inventor(s)    JOSEPH T. SHACKEL                (SJT-104-A)

It is certified that error appears in the above-identified patent and that said Letters Patent are hereby corrected as shown below:

IN THE SPECIFICATION:

Column 3, line 26, delete "separation", first occurance.

Column 4, line 27, insert --base-- after "channel shaped".

IN THE CLAIMS:

Column 5, line 12, insert a period after "a".

Column 5, line 32, insert a comma after "position"

Column 6, line 10, delete "the".

Signed and sealed this 13th day of July 1971.

(SEAL)
Attest:

EDWARD M. FLETCHER, JR.        WILLIAM E. SCHUYLER, JR.
Attesting Officer             Commissioner of Patents